United States Patent
Finetti et al.

(10) Patent No.: US 11,168,737 B2
(45) Date of Patent: Nov. 9, 2021

(54) HUB BEARING ASSEMBLY FOR A MOTOR VEHICLE WHEEL

(71) Applicant: Aktiebolaget SKF, Gothenburg (SE)

(72) Inventors: William Finetti, La Loggia (IT); Paolo A Re, Nichelino (IT)

(73) Assignee: AKTIEBOLAGET SKF

(*) Notice: Subject to any disclaimer, the term of this patent is extended or adjusted under 35 U.S.C. 154(b) by 0 days.

(21) Appl. No.: 16/983,656

(22) Filed: Aug. 3, 2020

(65) Prior Publication Data
US 2021/0033142 A1 Feb. 4, 2021

(30) Foreign Application Priority Data
Aug. 1, 2019 (IT) .......... 102019000013587

(51) Int. Cl.
*F16C 33/72* (2006.01)
*F16C 33/58* (2006.01)

(52) U.S. Cl.
CPC .......... *F16C 33/723* (2013.01); *F16C 33/586* (2013.01); *F16C 2223/70* (2013.01); *F16C 2326/02* (2013.01)

(58) Field of Classification Search
CPC .............. B60B 27/0005; B60B 27/001; B60B 27/0094; F16C 33/586; F16C 33/723; F16C 35/077; F16C 2223/70; F16C 2326/02
See application file for complete search history.

(56) References Cited

U.S. PATENT DOCUMENTS

| | | | | |
|---|---|---|---|---|
| 5,975,647 A | * | 11/1999 | Pons | B60B 27/02 301/108.1 |
| 6,127,819 A | * | 10/2000 | Ouchi | G01P 1/02 324/173 |
| 2007/0072714 A1 | * | 3/2007 | Filip | F16C 33/723 474/144 |
| 2007/0147719 A1 | | 6/2007 | Komori | |
| 2008/0006357 A1 | * | 1/2008 | Wakabayashi | B60C 23/12 152/415 |
| 2010/0296760 A1 | * | 11/2010 | Kapaan | B60B 27/0094 384/477 |

(Continued)

FOREIGN PATENT DOCUMENTS

| | | |
|---|---|---|
| DE | 10244721 | 5/2003 |
| DE | 112007001917 | 5/2019 |
| EP | 2170628 | 4/2010 |

(Continued)

OTHER PUBLICATIONS

International Search Report for corresponding Italian Patent Application No. 102019000013587 dated Jun. 3, 2020.

*Primary Examiner* — Phillip A Johnson
(74) *Attorney, Agent, or Firm* — Reed Smith LLP

(57) ABSTRACT

Hub bearing assembly for a vehicle wheel, the assembly having an axial tubular appendage capable of being inserted into a central hole of a wheel of the vehicle, and wherein the tubular appendage has a radially outer surface of substantially cylindrical shape; a collar of cylindrical shape being mounted on the tubular appendage so as to cover a second centring section of the radially outer cylindrical surface, and having an insert of metallic material and an inner coating layer which at least partially covers the insert and is formed on the insert by galvanizing.

9 Claims, 1 Drawing Sheet

(56) References Cited

U.S. PATENT DOCUMENTS

2012/0177312 A1\* 7/2012 Aritake ................ F16C 33/783
                                                                    384/446

FOREIGN PATENT DOCUMENTS

| WO | 2003064238 | 8/2003 |
| WO | 2005059386 | 6/2005 |
| WO | 2008145162 | 12/2008 |

\* cited by examiner

HUB BEARING ASSEMBLY FOR A MOTOR VEHICLE WHEEL

CROSS REFERENCE TO RELATED APPLICATION

This application is based on and claims priority under 35 U.S.C. § 119 to Italian Application No. 102019000013587, filed Aug. 1, 2019, the entire contents of which are incorporated herein by reference.

DESCRIPTION

Field

The present disclosure relates to a hub bearing assembly for a vehicle wheel.

Background

Hub bearing units for a vehicle wheel may include a hub that forms a tubular appendage projecting from the axially outer side of the hub and having an outer cylindrical surface for centring the wheel. The hub also forms a radially extended flange through which axial holes are formed for fastening bolts by means of which the wheel and a brake disc are fastened to the hub.

BRIEF DESCRIPTION OF THE INVENTION

The object of the present invention is to protect such cylindrical surfaces (or centring surfaces) in a simple, economical and effective way, while avoiding the drawbacks discussed above. Another object is to provide protection that can be applied speedily.

These objects are achieved, by a hub bearing assembly in accordance with this disclosure. A variety of embodiments in accordance with this disclosure are defined in the dependent claims.

BRIEF DESCRIPTION OF THE DRAWINGS

The invention will now be described with reference to the attached drawings, which show a non-limiting example of its embodiment, in which.

DETAILED DESCRIPTION

When two metal parts come into contact with one another, the presence of moisture and/or oxygen in the air commonly causes oxidation and corrosion phenomena, for example galvanic corrosion, that occur at the interface of the hub surface for centring the wheel, and, in such an eventuality, the metal parts in contact, namely the wheel, brake disc and bearing on the "outboard", or axially outer, side, tend to adhere firmly and are at risk of damage when they are forcibly separated from one another during maintenance operations.

In order to prevent the aforementioned drawback, various solutions have been proposed, for example the application of antioxidant materials to an outer cylindrical surface of the aforementioned tubular appendages, these materials typically being varnishes and setting in air or by the action of ultraviolet light sources, but such application takes time and is therefore incompatible with production processes requiring high speeds, especially if the drying or setting of the varnish takes place in air, while costly investment is necessary if the setting is accelerated by ultraviolet light.

Figure 1:
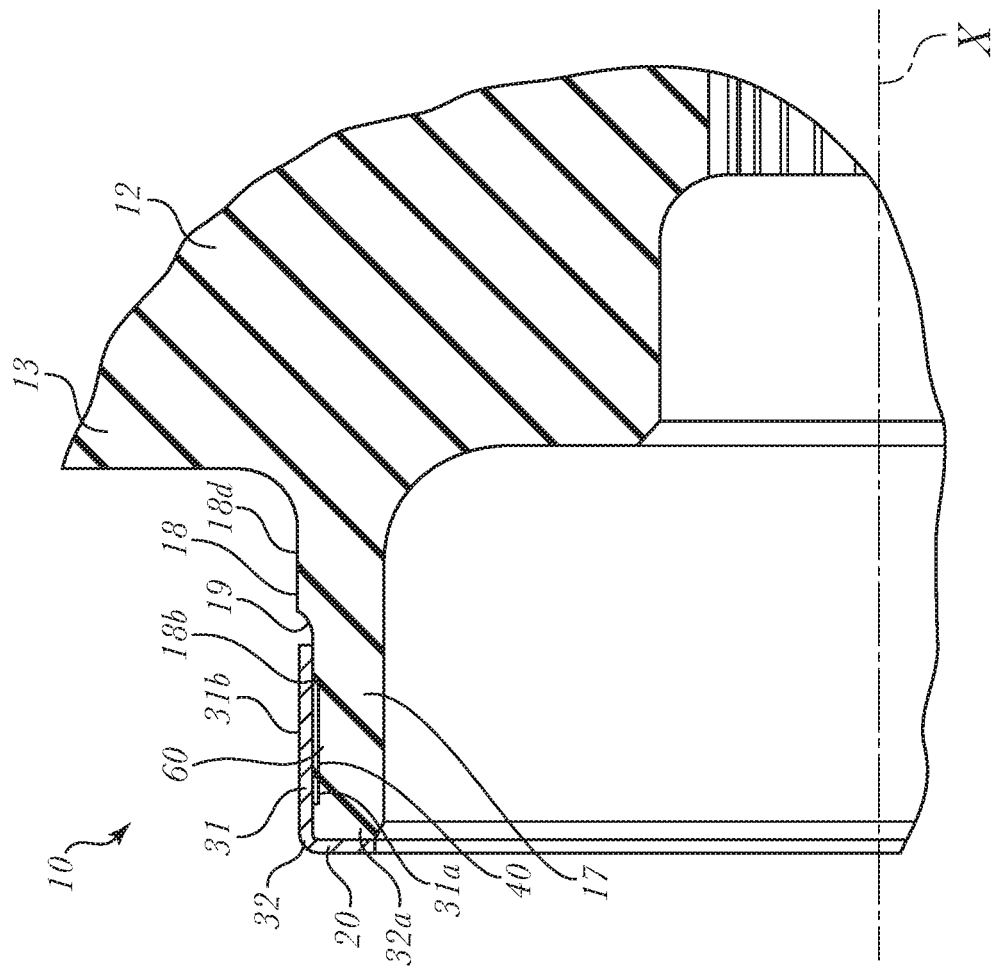
FIG. 1 is a view in axial section, with parts removed for clarity, of a hub bearing assembly according to an embodiment of the invention.

With reference to FIG. 1, the whole of a hub bearing assembly is indicated by 1.

The assembly 10 is used for rotatably mounting a wheel (not shown) on to an upright (not shown) in the suspension of a vehicle, around a central axis of rotation x. Throughout the present description and the claims, terms and expressions indicating positions and directions, such as "radial" and "axial", are to be understood as relating to the axis of rotation x of the hub bearing unit.

The hub bearing assembly 10 includes a flanged hub 12 that is rotatable around the axis x, and a flange 13 fixed to the flanged hub 12 and transverse to the axis x. Flanged hub 12 and flange 13 are two metal elements, typically made of steel, which are connected to the wheel: for this purpose, axial holes (not shown) are formed through the flange 13 for receiving fastening bolts (not shown) by means of which a wheel (not shown) is fastened to the flanged hub 12.

The flanged hub 12 forms a tubular appendage 17, also known by the English term "spigot", that projects from the axially outer side of the hub beyond the flange 13. The tubular appendage 17 has a radially outer surface 18, of substantially cylindrical shape, and comprises a first centring section 18$d$ near the flange 13 and a second centring section 18$b$, which continues axially beyond the first centring section 18$d$ and has a diameter B smaller than a diameter A of the first centring section 18$d$. The two sections 18$d$ and 18$b$ are capable of forming a surface for centring a wheel and a brake disc, respectively, and are connected to one another by a link 19, while the section 18$d$ is axially delimited by an outer lateral edge 20 of the tubular appendage 17, transverse to the axis x.

The tubular appendage 17 is intended to be fitted into a central hole of the wheel, in a known way. In the present example, the appendage 17 is formed so as to be fixed to the hub 12 as one piece. In other embodiments (not shown), the tubular appendage 17 is formed by a separate tubular element, which is coupled to the rest of the hub so as to be fixed to it or integral with it.

Figure 2:
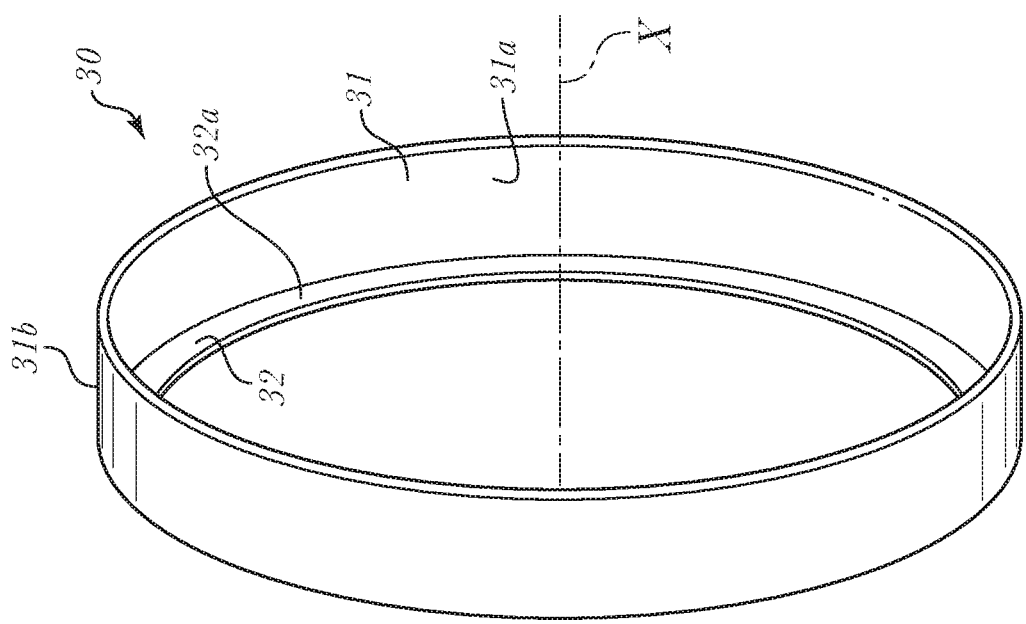
FIG. 2 is a perspective view of a collar belonging to the assembly of FIG. 1.

The hub bearing assembly 10 comprises a collar 30 of cylindrical shape, which is made of metallic material, is mounted on the tubular appendage 17 so as to cover the radially outer cylindrical surface 18, particularly so as to cover only the second centring section 18$b$, and comprises a tubular portion or tubular insert 31 coaxial with the axis x and a flanged portion 32 transverse to the axis x and fixed to the tubular portion 31. As is also shown in FIG. 2, the tubular portion 31 has a radially inner cylindrical surface 31$a$ positioned in direct contact with the second centring section 18$b$, and a radially outer cylindrical surface 31$b$ coaxial with the radially inner cylindrical surface 31$a$ and defining with the radially inner cylindrical surface 31$a$ a radial thickness S of the tubular portion 31. The flanged portion 32 has an axially inner annular surface 32$a$ positioned in direct contact with the outer lateral edge 20 of the tubular appendage 17, transverse to the axis x.

The thickness S of the cylindrical portion 31 is less than half the difference between the diameter A of the first centring section 18$d$ and the diameter B of the second centring section 18$b$, while an axial length L of the tubular portion 31 is less than a distance between the outer lateral edge 20 of the tubular appendage 17 and the link 19. This design of the collar 30 has been devised to avoid any mounting interference with the brake disc (not shown); in fact, since the axial position of the collar 30 on the tubular appendage 17 is determined by the abutment of the flanged portion 32 behind the outer lateral edge 20 of the tubular appendage 17, the provision of an axial length L smaller than the distance between the outer lateral edge 20 and the link 19 prevents the tubular portion 31 from overlapping and/or interfering with the link 19 or interfering with the mounting of the brake disc. Additionally, since the thickness S of the cylindrical portion 31 is less than half of the difference between the diameter A and the diameter B, the radially outer cylindrical surface 31b always remains radially separate from the first centring section 18d, thus always allowing not only the convenient mounting of the brake disc but also the convenient mounting and removal of the wheel.

Additionally, the axial length L of the tubular portion 31 is preferably between a minimum value of 4 mm, below which it would not be possible to mount the collar 30 securely on the second centring section 18b, and a maximum value of 10 mm, above which it would not be possible to fit the collar 30 on to the second centring section 18b without deforming the collar 30, even though the flanged portion 32 has a radial dimension D of between 1 and 6 mm. If the radial dimension D of the flanged portion 32 were less than 1 mm, there would not be a sufficient surface area for any pushing implement to exert the pushing action on the collar 30 required to fit it on to the second centring section 18b, while if the radial dimension D of the flanged portion 32 were greater than 6 mm, the flanged portion 32 would be too rigid compared with the tubular portion 31, which would tend to become conical during mounting.

In order to avoid any oxidation and corrosion phenomena, for example galvanic corrosion, which might occur at the interface between the second centring section 18b and the collar 30, the latter, which, it will be recalled, is made of metallic material, or at least the tubular portion 31 is made of metallic material, further comprises a layer of coating material 40 made by galvanizing the collar 30, and positioned to cover the radially inner cylindrical surface 31a of the tubular portion 31 so as to be interposed between the second centring section 18b and the collar 30. In some embodiments a layer of coating material 40 made by galvanizing the collar 30 is a galvanized coating material.

Preferably but not necessarily, the tubular appendage 17 also has an annular groove 60 formed through the second centring section 18b to facilitate the mounting of the collar 30 on the tubular appendage 17 by acting as a basin for collecting any chips or fragments of metallic material that might be separated from the collar 30 or from the tubular appendage 17 as a result of the friction between the collar 30 and the tubular appendage 17 during mounting.

In addition to the embodiments of the invention as described above, it is to be understood that numerous other variants exist. It is also to be understood that said embodiments are provided solely by way of example and do not limit the object of the invention or its applications or its possible configurations. On the contrary, although the description given above enables those skilled in the art to implement the present invention according to at least one example of its configurations, it is to be understood that numerous variations of the components described may be envisaged without thereby departing from the object of the invention as defined in the appended claims, interpreted literally and/or according to their legal equivalents.

The invention claimed is:

1. A hub bearing assembly, the assembly comprising:
an axial tubular appendage capable of being inserted into a central hole of a wheel of a vehicle, wherein the wheel has an axis of rotation (X), wherein the tubular appendage defines a cylindrical radially outer surface and an outer lateral edge,
a collar of cylindrical shape configured such that when mounted on the tubular appendage the collar covers a second centring section of the radially outer surface, wherein the collar comprises an insert of metallic material and an inner coating layer which at least partially covers the insert and is formed on the insert by galvanizing;
wherein the collar further comprises a flanged portion fixed to the insert of metallic material, wherein the flanged portion is transverse to the axis of rotation (X) and has an axially inner annular surface configured to contact the outer lateral edge of the axial tubular appendage.

2. The hub bearing assembly of claim 1, wherein the radially outer surface comprises a first centring section axially aligned with the second centring section and having a diameter (A) greater than a diameter (B) of the second centring section; the insert defining a cylindrical portion of the collar having a radial thickness (S) which is less than half of the difference between the diameter (A) of the first centring section and the diameter (B) of the second centring section.

3. The hub bearing assembly of claim 2, wherein the flanged portion has an axial length (L) having smaller dimensions than the axial dimensions of the second centring section.

4. The hub bearing assembly of claim 3, wherein the axial length (L) of the insert of metallic material is between a minimum value of 4 mm and a maximum value of 10 mm.

5. The hub bearing assembly of claim 1, wherein the inner coating layer is a galvanized coating material.

6. A hub bearing assembly, the assembly comprising:
an axial tubular appendage capable of being inserted into a central hole of a wheel of a vehicle, wherein the wheel has an axis of rotation (X), wherein the tubular appendage defines a cylindrical radially outer surface,
a collar of cylindrical shape configured such that when mounted on the tubular appendage the collar covers a second centring section of the radially outer surface, wherein the collar comprises an insert of metallic material and an inner coating layer which at least partially covers the insert and is formed on the insert by galvanizing;
wherein the radially outer surface comprises a first centring section axially aligned with the second centring section and having a diameter (A) greater than a diameter (B) of the second centring section; the insert defining a cylindrical portion of the collar having a uniform radial thickness (S) which is less than half of the difference between the diameter (A) of the first centring section and the diameter (B) of the second centring section.

7. The hub bearing assembly of claim 6, wherein the collar comprises a flanged portion fixed to the insert of metallic material, which has an axial length (L) having smaller dimensions than the axial dimensions of the second centring section.

8. The hub bearing assembly of claim 7, wherein the axial length (L) of the insert of metallic material is between a minimum value of 4 mm and a maximum value of 10 mm.

9. The hub bearing assembly of claim 6, wherein the inner coating layer is a galvanized coating material.

\* \* \* \* \*